United States Patent [19]
Andersen

[11] Patent Number: 5,651,403
[45] Date of Patent: Jul. 29, 1997

[54] PRESSURIZABLE FLEXIBLE-WALLED CONTAINER HAVING A SNAP CLOSURE FOR ITS FILLING NOZZLE

[75] Inventor: Carsten Andersen, Aalborg SV, Denmark

[73] Assignee: Bates Emballage A/S, Norresundby, Denmark

[21] Appl. No.: 403,719

[22] PCT Filed: Sep. 14, 1992

[86] PCT No.: PCT/DK92/00276
§ 371 Date: Mar. 14, 1995
§ 102(e) Date: Mar. 14, 1995

[87] PCT Pub. No.: WO94/06695
PCT Pub. Date: Mar. 31, 1994

[51] Int. Cl.⁶ ............................................. B65D 30/24
[52] U.S. Cl. ..................... 141/383; 141/114; 141/313; 410/119; 137/223; 137/226; 383/66; 383/904
[58] Field of Search .................... 141/10, 114, 197, 141/313, 314, 317, 348, 349, 383; 410/119, 125; 383/66, 904; 137/223, 226; 251/342, 349

[56] References Cited

U.S. PATENT DOCUMENTS

| 3,960,281 | 6/1976 | Reeves | 140/119 |
| 4,073,389 | 2/1978 | Angarola et al. | 140/119 |
| 4,146,070 | 3/1979 | Angarola et al. | 141/349 X |
| 5,111,838 | 5/1992 | Langston | 137/223 |
| 5,367,726 | 11/1994 | Chaffee | 137/226 X |

FOREIGN PATENT DOCUMENTS

| 0133749 | 3/1985 | European Pat. Off. |
| 2648112 | 12/1990 | France . |
| 425233 | 9/1989 | Sweden . |
| 9110598 | 7/1991 | WIPO . |

*Primary Examiner*—J. Casimer Jacyna
*Attorney, Agent, or Firm*—Cushman Darby & Cushman IP Group of Pillsbury Madison & Sutro LLP

[57] ABSTRACT

A closure for sacks, bags and like containers which have non-rigid walls and which are to be pressurized. The closure includes a filling nozzle having a tubular stub and a flange. The flange has a tubular cylindrical portion and a plate-shaped portion. The plate-shaped portion of the flange is attached to the container. The filling nozzle may be caused to sealingly engage the flange by use of a snap connection, whereby the closure is either completely open or closed. The snap connection either retains the filling nozzle in firm and tight engagement with the flange, or releases the filling nozzle in relation to the flange.

9 Claims, 3 Drawing Sheets

PRESSURIZABLE FLEXIBLE-WALLED CONTAINER HAVING A SNAP CLOSURE FOR ITS FILLING NOZZLE

TECHNICAL FIELD

The invention relates to a closure for sacks, bags and like containers with non-rigid walls, the containers to be pressurised and the closure comprising a filling nozzle with a valve (i.e., a tubular stub) and a separate flange having a cylindrical portion and a plate-shaped portion where said flange is adapted to be attached to the container through the plate-shaped portion.

BACKGROUND ART

Valves are known for sacks or bags to be pressurised, for instance with air, the valve comprising a flange and a threaded connection. The screwed connection has to be detached from the flange, if the valve is to be opened and tightened if the bag or sack is to maintain the air pressure. The valve per se can be further secured by means of a separate plug. Such valve constructions known inter alia from Swedish published specification No. 425.233 and PCT publication No. WO 91/10598.

SUMMARY OF THE INVENTION

The object of the invention is to provide a closure which is either opened or closed, and which closure can be completely opened by one single operation to obtain a high deflation rate and which closure equally can be closed by one single operation, so that the closure is either completely opened or completely closed both visibly and functionally.

The closure according to the invention is characterised in that the filling nozzle is hingedly connected to a lower portion which is adapted to be pivotally connected to the outer side of the cylindrical portion of the flange by means of a snap connection, and that the filling nozzle is adapted to be arranged in sealingly engagement with the flange by means of at least one snap connection. As a result, the filling nozzle is easy to secure to the flange, and from the flange it is easily caused to enter the closed or the completely open state. The pivotal securing implies that the filling nozzle can always be turned into a position in which it is easiest to handle, and the securing of the filling nozzle to the flange by means of a snap connection implies that the closure can be easily opened completely so as to allow a fast outflow of air from the sack or be closed for the filling in of air through the filling nozzle or be completely closed by means of a separate plug.

An embodiment of the closure according to the invention is characterised in that a seal is arranged between a valve holder placed in the filling nozzle and the interior face of the cylindrical portion of the flange. As a result, a suitable sealing compound may be used and the sealing portions are well-defined, for instance as a line seal or at large deformation of the sealing as a surface seal.

Moreover, according to the invention a protrusion for engagement with the flange at the transition between the cylindrical portion and the plate-shaped portion may be arranged on the valve holder of the filling nozzle, whereby the protrusion may be caused to interact with the flange when the closure is closed.

According to the invention, the position of the protrusion and of the snap connections may essentially define a plane intersecting a second plane essentially defined by the contact borders of the sealing ring to the valve holder and the flange, respectively. As a result, it is ensured that the sealing ring is always arranged at the same position in the cylindrical portion of the flange and that the protrusion together with the snap connection determine the position of the seal.

Furthermore, according to the invention the snap connection may comprise at least one snap hook arranged diametrally opposite the protrusion when seen in relation to the flange, whereby the point of engagement of the snap hook and that of the protrusion is arranged on opposite sides of the sealing.

Moreover, according to the invention the protrusion may abut an area of a circumferential recess provided in the flange between the cylindrical portion and the plate-shaped portion, whereby a more precise arrangement of the sealing ring is ensured. In addition, it is possible to turn the closure relative to the flange even when the filling nozzle closingly engages the flange.

In another embodiment of the closure, the valve holder may be provided with a bayonet lock on the side facing away from the flange at complete closure for a gripping coupling, wherein the line of engagement of the bayonet lock is arranged as a radial extension when seen in relation to the axis of symmetry of the flange. As a result, the gripping coupling can be connected quickly and correctly to the filling nozzle when the container is to be filled with air.

Moreover, at least one of the protrusions of the bayonet lock may be provided with an opening facing the protrusion on the valve holder, whereby the manufacture thereof is greatly facilitated, as only two-part tools are required.

It has proved advantageous that the area of the opening be larger than the projected area of the protrusion on the opening.

BRIEF DESCRIPTION OF THE DRAWINGS

The invention is described in greater detail in the following with reference to the accompanying drawings, in which.

DETAILED DESCRIPTION OF THE BEST MODE FOR CARRYING OUT THE INVENTION

Figure 1:
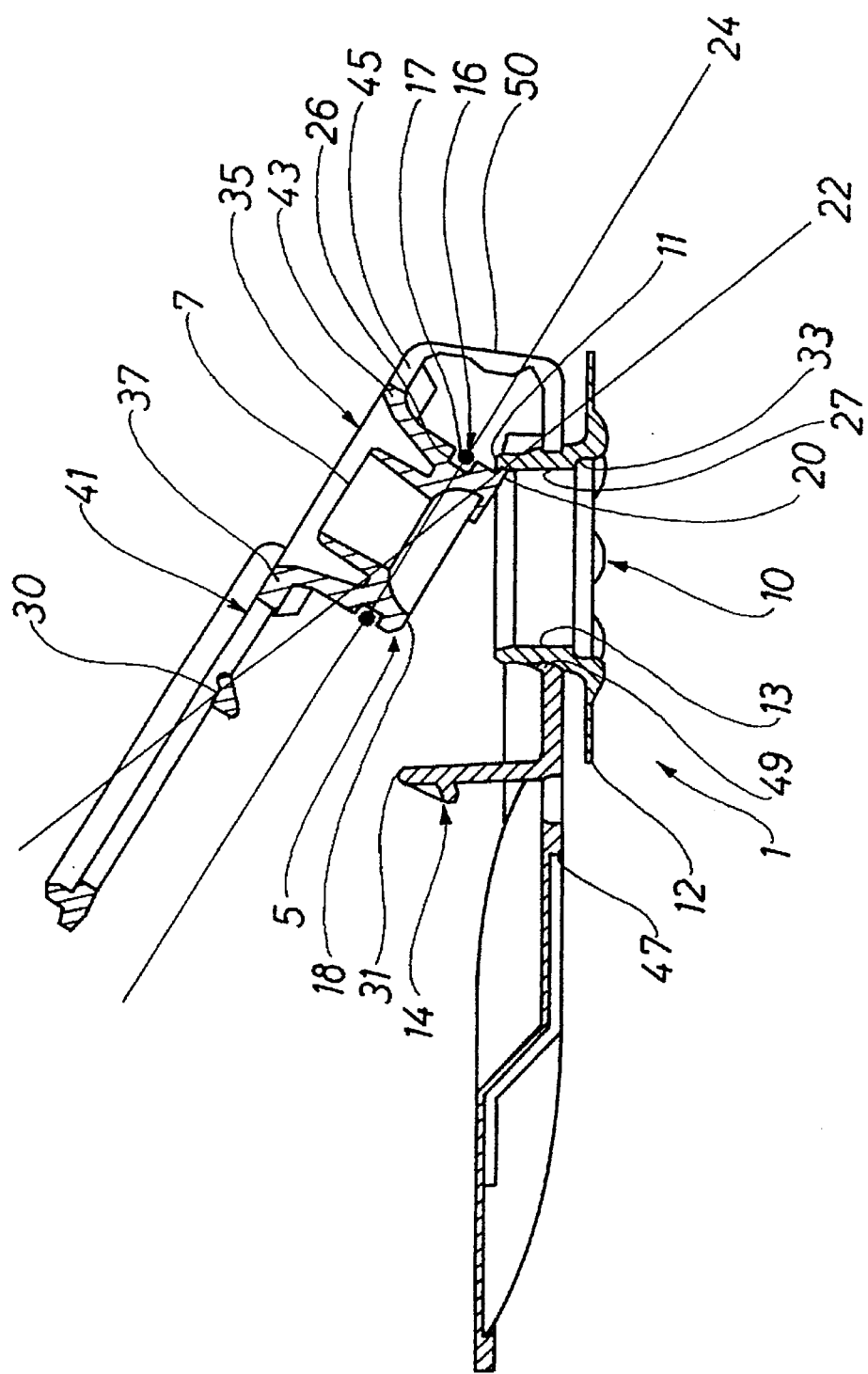
FIG. 1 shows an embodiment of the closure, partly in a sectional view.
Figure 2:
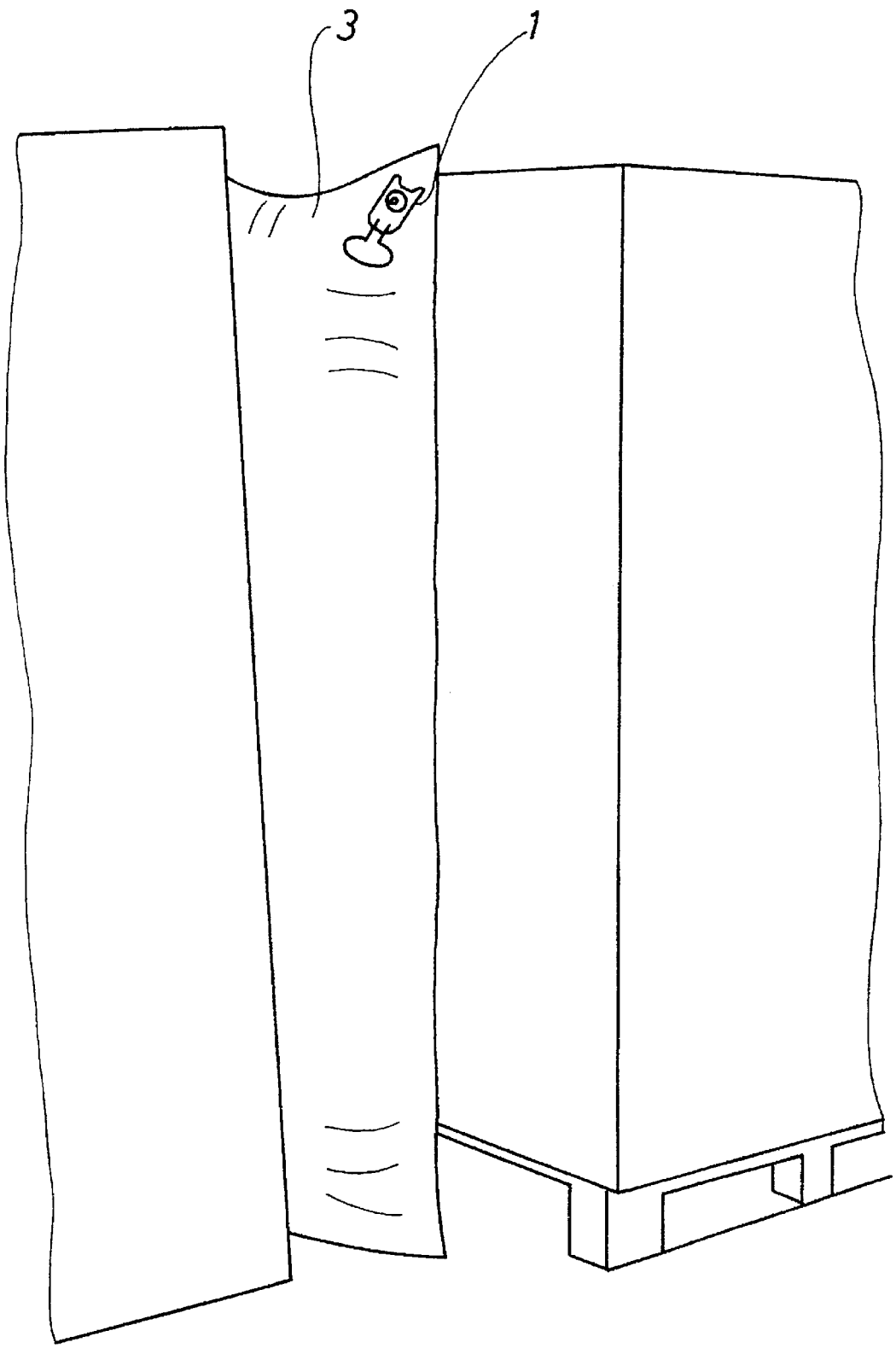
FIG. 2 illustrates a closure arranged on a container.
Figure 3:
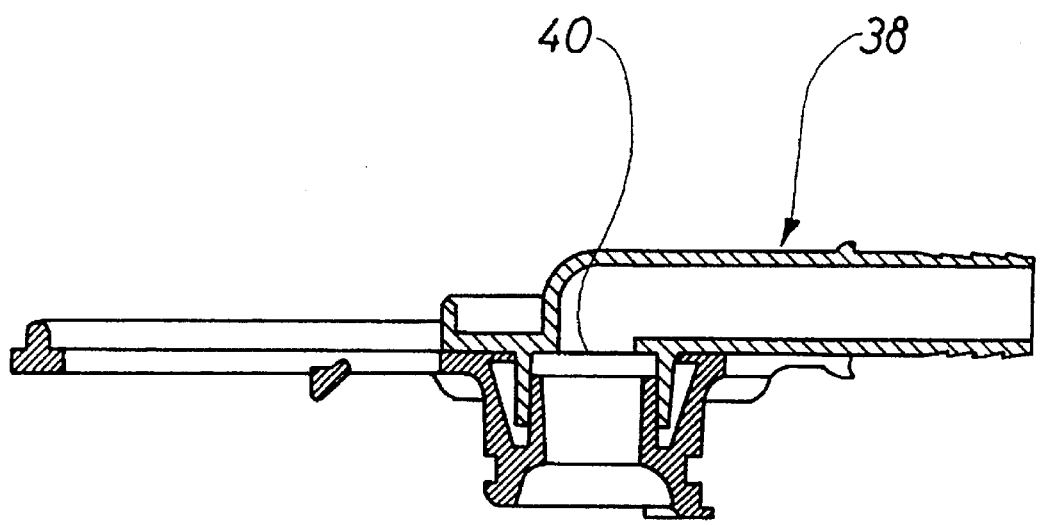
FIG. 3 illustrates the filling nozzle and the bayonet lock.

The closure of FIG. 1, designated as a whole by the reference numeral (1), is intended for use on sacks or like container (3) (cf. FIG. 3) with non-rigid walls. The containers usually comprise several layers of paper and plastics, wherein the individual layers may be laminated together or placed adjacent each other. The paper layers are normally made from recycled paper and are intended to reinforce the container against tearing. The plastics sheets are normally polyethylene sheets, but other types of plastics sheets may be used and arranged in such a manner that the strength properties of the individual layers are utilized in the best possible way. The object of the plastics sheet is to ensure that the container remains essentially air proof. The sacks, bags or the containers are usually used as dunnage equipment in storage compartments. The object of the dunnage is to fill out minor spaces between the objects being loaded into the storage compartment, thus ensuring that the cargo does not shift during transport. Furthermore, the dunnage equipment may serve as a shock-absorbing element, thus ensuring that the cargo arrives in an undamaged condition. The dunnage equipment is used within the all types of cargo transport, for instance in shipping, container transport or haulage. The dunnage equipment may also be used as part of the packing of for instance a large fragile machine. When the cargo has been loaded, the non-inflated containers (3) are placed in between the individual cargo items. Through the filling nozzle (5) the containers are pressurised by means of compressed air, usually only a minor high pressure is provided, by the inflation. The size of the container may vary, but is normally between approximately 60×110 cm and approximately 100×220 cm and the container may usually be inflated up to a thickness of about 50 cm.

The closure of FIG. 1 comprises a filling nozzle (5) with a means for receiving or holding a closable valve (7) and a flange (10). The flange (10) comprises a cylindrical, tubular portion (11) and a plate-shaped portion (12) which is attached to one or more plastics laminate portions of the container (3). The flange (10) is made from a plastics material which may be bonded to a plastics sheet in the laminates. The flange (10) does not have to be made from the same material as the filling nozzle (5) per se. This is advantageous, in that the filling nozzle (5) per se must be able to tolerate tensile stress, as well as possess resilient properties in order to ensure a snap effect so as to tolerate being bent many times.

When the container is to be closed, the filling nozzle (5) is caused to sealingly engage the flange (10) and is retained in this connection by means of a snap connection (14). The snap connection may be constructed as either a circular snap connection or as a protrusion-shaped snap connection as shown, wherein the protrusions consist of a snapping hook (31) engaging a snapping hook (30) on the filling nozzle (5).

Between the interior face (13) of the cylindrical tubular portion (11) of the flange (10) and the valve holder (18) of the filling nozzle a seal (16) is arranged. The sealing element (16) comprises a sealing ring (17) arranged in a groove in the valve holder (18). The sealing ring (17) is an ordinary O-ring of a soft rubber material, preferably of a circular cross; section, but may be constructed as an angular lip seal. By not having the valve holder (18) sealingly engage the flange (10), greater possibilities for varying the choice of material and wearable parts are obtained. The sealing ring (17) tends to wear out according the roughness of its abutting surfaces.

A protrusion (20) is provided on the valve holder (18) of the filling nozzle (5). The protrusion and one of the snap hooks (30) of the snap connection (14) contribute to defining a plane (22). The plane (22) intersects a second plane (24) defined by the contact borders (26,27) of the sealing ring (17) to the valve holder (18) and the flange (10), respectively. Most advantageously, the two planes (22 and 24) intersect one another on the axis of symmetry of the valve installation site (7) the valve itself not being shown, as well as of the flange (10). By having the two planes intersect each other exactly at this position, a well-defined positioning of the sealing ring (17) is obtained.

As mentioned previously, the snap connection (14) preferably comprises two snap hooks (30,31), which are arranged diametrically opposite the protrusion (20) when seen in relation to the flange (10) as well as to the valve holder (18), when the filling nozzle 5 is closed. The snap hooks (30, 31) and the protrusion (20) are essentially constructed so as to form well-defined contact borders which, however, to a certain extent provide a form of surface contact due to the yielding of the material.

When the filling nozzle (5) is closed, the protrusion (20) abuts an area of a circumferential recess (33) provided in the flange (10) between the cylindrical portion (11) and the plate-shaped portion (12). The recess (33) per se may be constructed as a groove in the interior surface (13) of the cylindrical portion (11), which, as regards further processing, is not the most advantageous way to construct the recess.

When the container is to be filled with compressed air, various types of filling tools can be used for connecting a compressed-air hose to the container. In the embodiment shown, the valve holder (18) on the side (35) facing away from the flange (10) at closed closure is provided with a bayonet lock (37) for a gripping coupling (38). By means of a valve opener for the opener for the valve (not shown) mounted to the tubular stub 7, or a tap connected to the gripping coupling by means of a hose, the gripping coupling contributes to inflating the container. By making the gripping coupling (38) as small and as light as possible, the risk of damaging the container is minimized. The line of engagement (40) of the bayonet lock (37) is arranged as a radial extension (41) in relation to the central axis of the flange (10) when the closure is closed. This has proved most advantageous, in that the entire filling nozzle (5) is not pivoted about the flange (10) when the gripping coupling (38) is arranged. The gripping coupling (38) can thus be arranged using only one hand.

The protrusions (43) of the bayonet lock (37) on filling nozzle (5) are provided with an opening (45) facing the protrusion (20) on the valve holder (18). Although the opening reduces the strength of the bayonet lock (37), it enables the protrusion to be manufactured by means of injection moulding tools. Due to the opening (45), the tool may be produced as a two-part tool, whereby the area and the form of the opening (45) has to be slightly larger than the projected portion of the protrusion (20) on the opening (45).

The filling nozzle (5) comprises a lower portion (47), whereon the counter part (31) of the snap connection is placed. The lower portion (47) is attached to the outer side of the cylindrical portion of the flange (10). The lower portion (47) of the filling nozzle (5) is connected to the cylindrical portion of the flange (10) by means of a non-sealing snap connection (49). The snap connection (49) need not be sealing, as the sealing element (17) ensures sealing engagement with the interior face (13) of the flange (10). The filling nozzle (5), comprises a hinge (50) so that the valve holder (18) may be swung about relative to the lower portion (47). The lower portion (47) is only loosely attached in relation to the flange (10) so that it may be turned about the axis of symmetry of the flange (10). The lower part (47) may by provided with either a protrusion for retainment or holes for gripping, so that it is easier to handle the container (3) in its non-inflated state.

The invention is described with reference to a preferred embodiment. Many modifications may, however, be performed without thereby deviating from the scope of the invention.

I claim:

1. A closure for a pressurizable, flexible walled container, comprising:

a flange having a longitudinal axis and having a tubular cylindrical portion for providing a relatively large area outlet for pressurizing gas from the container, and a plate-shaped portion extending laterally outwardly from the tubular cylindrical portion, for perimetrical securement in an opening of a wall of the container for sealingly securing the flange in the wall; and a filling nozzle having a longitudinal axis and including a holder having a tubular stub, for providing a relatively small area inlet for pressurizing gas for the container;

the flange, and said holder of said filling nozzle including means cooperatively providing a snap connection for removably securing the tubular stub in constricting relation to said outlet;

means providing a circumferential seal between said holder and said tubular cylindrical portion when said snap connection providing means is snapped together;

said tubular stub including means for receiving a closable valve for said inlet, for maintaining pressurization within the container following introduction of pressurizing gas into the container through said inlet;

said closure including an axially outer portion having said tubular stub of said holder, and an axially inner portion which circumferentially surrounds and mounts to said tubular cylindrical portion of said flange at a second connection, which provides for rotation about the longitudinal axis of said flange;

said snap connection providing means including a snap hook provided on said axially outer portion and a snap element provided on said axially inner portion for snapping engagement with said snap hook; and a hinge hingedly connecting said axially outer and axially inner portions of said closure so that said axially outer and axially inner portions remain hinged together when the filling nozzle is unsnapped from the flange.

2. The closure of claim 1, wherein:

said seal providing means includes a sealing ring provided on said holder of said filling nozzle, circumferentially of said tubular stub, and an internal sealing surface provided on said flange circumferentially of said outlet, for sealing engagement along respective contact borders upon snapping-together of said snap connection providing means.

3. The closure of claim 2, wherein:

said sealing ring is made of soft rubber and has a circular radial transverse cross-section.

4. The closure of claim 2, further comprising:

a laterally outward protrusion provided on said holder;

said protrusion and said snap connection providing means of said holder being disposed in a first plane;

said contact of said sealing ring being disposed in a second plane; and said first and second planes intersecting one another.

5. The closure of claim 4, wherein:

said snap connection providing means includes at least one snap hook provided on said filling nozzle at a location which is dramatically opposite that of said protrusion, relative to the longitudinal axis of said filling nozzle.

6. The closure of claim 5, further including:

a recess internally provided in said filling nozzle for receiving said protrusion when said snap connection providing means are snapped together.

7. The closure of claim 6, further comprising:

an axially outwardly accessible bayonet lock provided on said holder arranged for removable, circumferential sealing and securement of a gripping coupling to said inlet, for introduction of pressurizing gas into the container through said inlet.

8. The closure of claim 7, further including:

said lock having at least one protrusion having an opening which faces said protrusion on said holder.

9. The closure of claim 8, wherein:

said opening of said one protrusion of said lock having an area facing said protrusion on said holder which is larger than the area of said protrusion on said holder facing said opening of said one protrusion of said lock.

* * * * *